United States Patent
Goldreyer

[11] Patent Number: 4,626,219
[45] Date of Patent: Dec. 2, 1986

[54] SCRIBE GUIDE

[76] Inventor: Ned Goldreyer, 56-15 201st St., Bayside, N.Y. 11364

[21] Appl. No.: 745,842

[22] Filed: Jun. 17, 1985

[51] Int. Cl.4 ........................ G09B 11/04; G09B 21/00
[52] U.S. Cl. ..................................... 434/162; 434/115
[58] Field of Search ............... 434/162, 163, 164, 165, 434/117, 112, 113, 114

[56] References Cited

U.S. PATENT DOCUMENTS

| | | | |
|---|---|---|---|
| 1,253,758 | 1/1918 | Wilkes | 434/162 |
| 3,514,874 | 6/1970 | Strohl | 434/162 |
| 3,667,139 | 6/1972 | Barr | 434/113 |
| 3,816,943 | 6/1974 | Henry | 434/117 |
| 3,879,611 | 4/1975 | Schroeder | 434/162 X |

FOREIGN PATENT DOCUMENTS

| | | | |
|---|---|---|---|
| 3226758 | 3/1983 | Fed. Rep. of Germany | 434/163 |
| 483443 | 4/1917 | France | 434/117 |

Primary Examiner—William H. Grieb
Attorney, Agent, or Firm—Richard L. Miller

[57] ABSTRACT

The invention is a sheet of writing paper that includes horizontal, parallel, equally spaced apart raised ridges for forming writing spaces therebetween, and a raised protrusion indicating the end of each writing space.

2 Claims, 6 Drawing Figures

U.S. Patent  Dec. 2, 1986  4,626,219
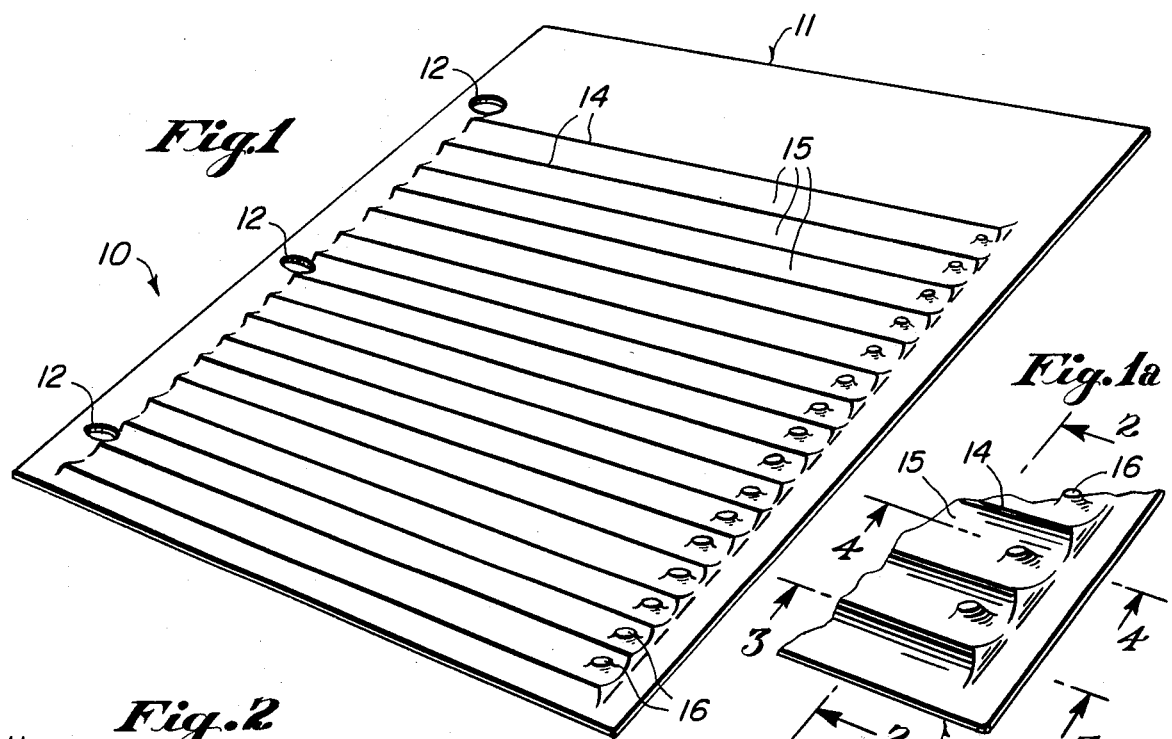
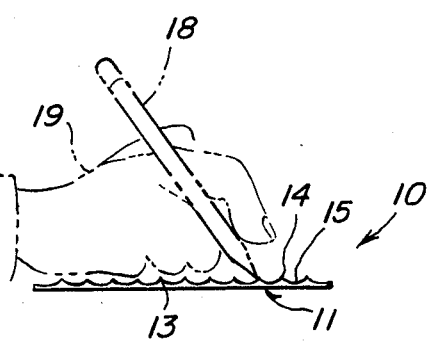

SCRIBE GUIDE

BACKGROUND OF THE INVENTION

This invention relates generally to guides such as are used for aid in longhand writing of text in a straight linear manner upon a sheet of paper.

It is well known that numerous such guides have been developed in the past in order that longhand writing may be done upon an unlined paper without gradually made to run at an inclined angle or the size of letters gradually being made longer toward an end of the line. Examples of these guides are evident in the U.S. Pat. Nos. 1,253,758 of Wilkes, 3,514,874 of Strohl, and 3,879,611 of Schroeder. However all of these guides have the limitation of requiring the writer's visual observation of the writing process while being done, so that they do not fully help when the writer's eyes are elsewhere occupied, such as when copying a text from another source. This situation is accordingly in want of improvement.

SUMMARY OF THE INVENTION

Therefore it is a principal object of the present invention to provide a scribe guide having three dimensional means for guiding a writer's hand while writing and thus not requiring the writer to watch the writing process with his eyes.

Another object accordingly is to provide a scribe guide which would be ideal for use by college students and the like who are obliged to copy extensive material out of textbooks or to rapidly copy long mathematical examples or other text from the blackboard before a teacher erases it to make room for additional material.

Yet another object is to provide a scribe guide which includes means to notify the unwatching writer when his writing is approaching a side edge of the paper so that he should then continue on a next following line.

Yet a further object is to provide a scribe guide which can be either incorporated structurally directly into the paper being written upon or else which can be made as a backing sheet for placement behind a plain paper that is being written upon.

Other objects are to provide a scribe guide which is simple in design, inexpensive to manufacture, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of a loose-leaf sheet of paper shown incorporating the present invention.

FIG. 1a is an enlarged detail thereof.

FIG. 2 is a cross sectional view taken on line 2—2 of FIG. 1a.

FIG. 3 is a cross sectional view taken on line 3—3 of FIG. 1a.

FIG. 4 is a cross sectional view taken on line 4—4 of FIG. 1a.

FIG. 5 is a side elevational view taken of a sheet of paper (with the invention incorporated therein) shown being written thereupon while the writer looks elsewhere.

DETAILED DESCRIPTION OF THE PREFERRED EMBODIMENTS

Referring now to the Drawing in greater detail, the reference numeral 10 represents a scribe guide according to the present invention wherein there is a sheet of writing paper 11 which, as shown, may be made to include ring holes 12 along one edge thereof so that it can be inserted on the rings of the loose-leaf note book such as is used by students.

In the present invention, a plurality of equally spaced apart, parallel, linear indentions 13 are preferably scribed upwardly on the underside of the paper so as to form rows of raised ridges 14 on the upper side of an otherwise smooth paper, the ridges extending horizontally nearly across the paper. Thus an arcuate smooth space 15 between the lines defines an area for longhand writing of text or the like. Alternately, as shown in the drawing, the ridges 14 may be formed by upward folds. The present invention also includes an upwardly raised protrusion 16 formed near a right end of each writing space 15, and which may be made approximately a same height above the top surface of the space 15 as the ridges 14.

In operative use of the invention, the ridges serve as guides for writing a straight line, and the protrusions serve as indicators that the writing is reaching the end of the line, and should accordingly be continued on the next line so as to not run off the right side of the paper. The writer 17 holds the pen or pencil 18 in his hand 19, and as he writes, his hand glides or rests upon the paper so that it feels the ridges against the underside of the hand. Near the end of the line, the hand will suddenly feel the protrusion. Thus the writer's sight 20 may be directed either to a blackboard, a textbook, or other object while writing. If preferred, an additional protrusion may be made at the left end of each line to guide where the writing may be started.

Although the raised ridges 14 on the upper side of the sheet of writing paper 11 are depicted as appearing almost sharp as seen in FIG. 2, it is to be understood that these ridges might be more rounded and there is an unlimited number of ways in which this cross section might be modified and still be quite suitable for the intended purpose.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A scribe guide, comprising, in combination, a sheet of writing paper and a plurality of parallel, equally spaced apart, raised ridges formed upon an upper side of said paper defining arcuate smooth grooves therebetween which form writing spaces, said ridges extend horizontally on said paper, and an upwardly raised protrusion is formed on the writing paper near a right side end of each said writing space midway between adjacent raised ridges.

2. The combination as set forth in claim 1, wherein said paper includes ring holes along one side edge thereof for insertion in a loose-leaf notebook.

* * * * *